United States Patent [19]
Saito

[11] Patent Number: 5,615,841
[45] Date of Patent: Apr. 1, 1997

[54] FISHLINE ENTRANCE PREVENTIVE DEVICE FOR A FISHING REEL

[75] Inventor: Masaji Saito, Saitama, Japan

[73] Assignee: Daiwa Seiko Inc., Tokyo, Japan

[21] Appl. No.: 356,543

[22] Filed: Dec. 15, 1994

[30] Foreign Application Priority Data

Dec. 17, 1993 [JP] Japan ................... 5-72716 U

[51] Int. Cl.⁶ ............................................. A01K 89/01
[52] U.S. Cl. ........................ 242/231; 242/319; 242/322
[58] Field of Search ................................. 242/319, 322, 242/231

[56] References Cited

U.S. PATENT DOCUMENTS

| | | | |
|---|---|---|---|
| 3,329,371 | 7/1967 | Willis et al. | 242/319 |
| 4,058,269 | 11/1977 | Nurmse | 242/319 |
| 4,106,718 | 8/1978 | Catignani | 242/319 |
| 4,418,877 | 12/1983 | Nakajima | 242/319 |
| 4,427,162 | 1/1984 | Noda | 242/319 |
| 4,561,604 | 12/1985 | Matsushima | 242/319 |
| 4,834,311 | 5/1989 | Kaneko | 242/319 |
| 5,318,247 | 6/1994 | Sugawara | 242/322 |

FOREIGN PATENT DOCUMENTS 3-9654   3/1991   Japan.

*Primary Examiner*—Katherine Matecki
*Attorney, Agent, or Firm*—Longacre & White

[57] ABSTRACT

In a spinning reel for fishing, a spool includes a fishline winding barrel portion, a front side flange, a rear cylindrical portion and the like. The spool further includes a recessed portion formed in the inside of the rear end portion of the rear cylindrical portion, and an annular portion is fixed integrally to the recessed portion. The annular portion includes a fixed portion and an annular skirt portion, while the annular skirt potion is so formed as to project inwardly. The leading end inner periphery of the annular skirt portion of the annular potion is opposed to the outer periphery of the large-diameter cylindrical potion of a rotor with a small clearance between them.

11 Claims, 5 Drawing Sheets

FISHLINE ENTRANCE PREVENTIVE DEVICE FOR A FISHING REEL

BACKGROUND OF THE INVENTION

The present invention relates to a spinning reel for fishing of a type that winds a fishline around a spool reciprocatable back and forth in linking with the rotation of a handle.

Conventionally, in a spinning reel for fishing, there is generally employed a structure that the cylindrical portion of a rotor is fitted into the cylindrical portion of a spool.

In order to reduce the size and weight of such spinning reel for fishing, for example, the outside diameters of the rotor and spool cylindrical portions may be reduced, the length of the spool cylindrical portion may be shortened, or the spool cylindrical portion may be formed thinner.

Originally, a clearance between the inner periphery of the spool cylindrical portion and the outer periphery of the rotor cylindrical portion must be small in order to prevent entrance of sand, strange substances, fishline and the like into the spinning reel. However, if the length of the spool cylindrical portion is shortened as described above, then there can be easily produced a clearance between the longitudinal direction of the spool cylindrical portion and the longitudinal direction of the rotor cylindrical portion, which makes it easy for the fishline and the like to move into the spool cylindrical portion.

Conventionally, there is disclosed in Japanese Utility Model Publication No. 3-9654 of Heisei a reel of a type that reduces the length of the above-mentioned spool cylindrical portion and includes a fishline entrance preventive device for preventing the fishline and the like from moving into the spool.

According to the structure disclosed in the above publication, there is provided an entrance preventive member (10) including an entrance preventive portion (10a, 10b) which prevents entrance of the fishline, and the entrance preventive member is arranged such that it is free to rotate with respect to a spool, is rotatable together with a rotary frame (4), and is movable with respect to a pair of support arms together with the spool.

Therefore, according to the above disclosed reel, not only the structure thereof is complicated but also, in actual use, if water or seawater enters or shocks are given when it is dropped, or if it is used under a very severe environment, then the spool cylindrical portion thereof can be deformed.

Such deformation causes the spool to come into contact with the rotor, which worsens the winding function of the reel or prevents the rotor from rotating.

Also, the deformed spool, similarly to the above, can prevent the entrance preventive member from rotating between the spool and the entrance preventive member.

Further, since the entrance preventive member, as described above, is interposed between the spool and rotary frame in such a manner that it is rotatable together with the rotary frame, if seawater or a strange substance attaches to the entrance preventive member, then the entrance preventive member is easily prevented from rotating normally.

Moreover, since the spool cylindrical portion is exposed except for the portion thereof that is hidden by the support arms of the rotor, if drop shocks or the like are given, then the spool cylindrical portion can be easily deformed. Similarly, when the spool cylindrical portion is formed thin as described above, it is easy to deform.

SUMMARY OF THE INVENTION

The present invention aims at eliminating the drawbacks found in the above-mentioned conventional reel. Accordingly, it is an object of the invention to provide a spinning reel for fishing in which a spool cylindrical portion is difficult to deform. Another object of the present invention is to provide a spinning reel for fishing in which a fishline and the like are difficult to move into the spool cylindrical portion. Yet another object of the present invention is to provide a spinning reel in which a handle can be operated comfortably. A further object of the present invention is to provide a spinning reel in which the size and weight of the reel can be reduced.

In attaining the above-noted and other objects, according to the invention, there is provided a spinning reel for fishing of a type that winds a fishline around a spool which is reciprocatable back and forth in linking with the rotational movement of a handle, in which an inwardly projecting annular portion is formed in the rear end portion of the rear cylindrical portion of the spool.

DETAILED DESCRIPTION OF THE PREFERRED EMBODIMENTS

Now, description will be given below in detail of the invention by means of the illustrated embodiments thereof. In particular, FIG. 1 is a sectional plan view of the main portions of a first embodiment of a spinning reel for fishing according to the invention.

Figure 1:
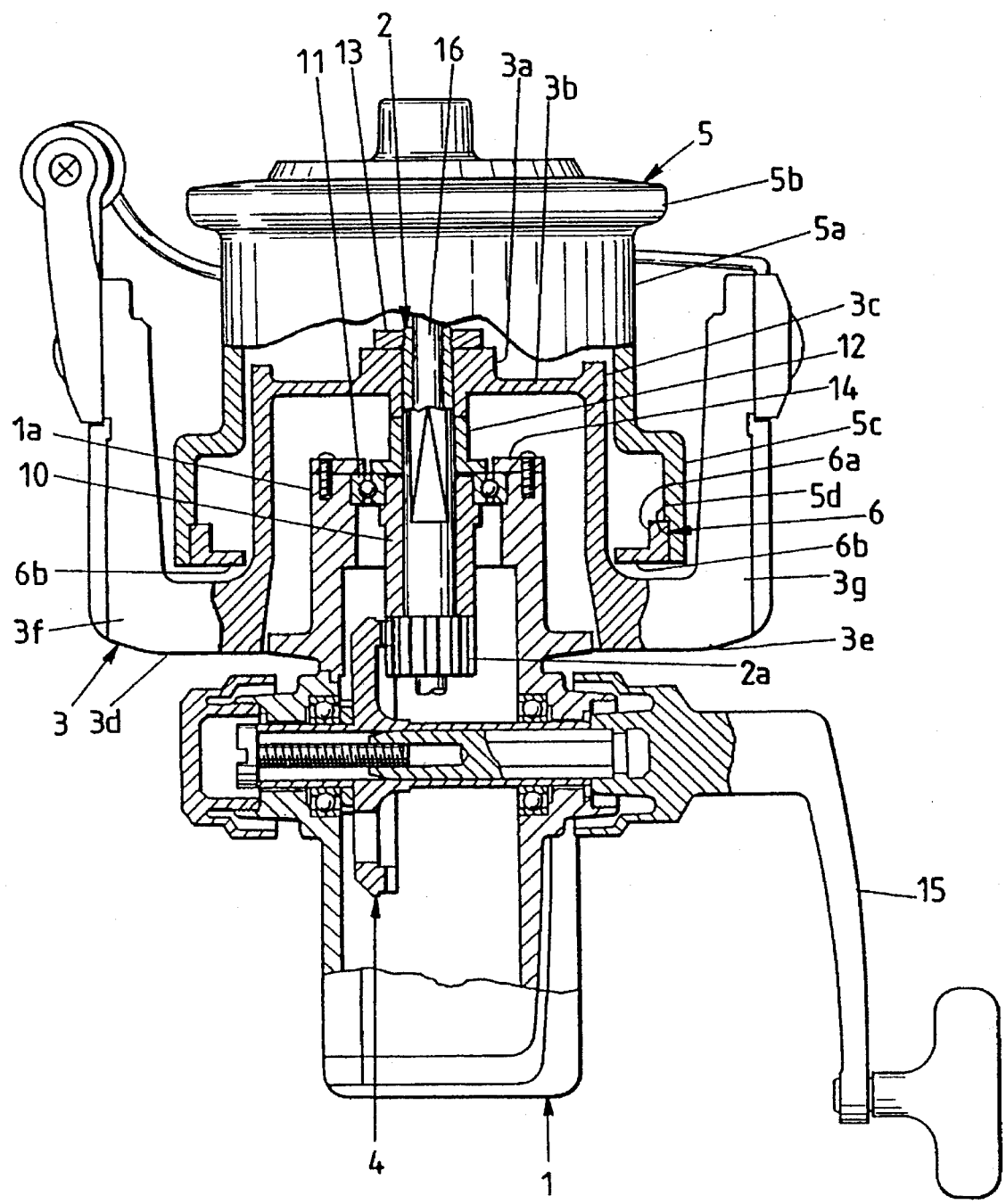
FIG. 1 is a sectional plan view of the main portions of a first embodiment of a spinning reel for fishing according to the invention.

In FIG. 1, a cylindrical drive shaft 2 is rotatably supported by a front portion 1a of a reel main body through a bearing 11 and a collar 10 fitted with the outer periphery of the drive shaft 2. Another collar 12 is fitted with the drive shaft 2 at the front portion of the bearing 11.

Also, a cylindrical portion 3a of a rotor 3 is fitted with the drive shaft 2 at the front portion of the collar 12 in a rotation preventive manner and is fixed in place by a nut 13.

The bearing 11 is prevented against removal by a stop plate 14.

The rotor 3 is supported in such a manner that it can be rotated in linking with the rotation of a handle 15 through a drive gear 4 in mesh with a pinion 2a provided in the drive shaft 2.

A spool 5 is supported on the leading end portion of a spool shaft 16 which is fitted into the drive shaft 2 and is projected therefrom, and the spool 5 can be reciprocated back and forth in linking with the rotation of the handle 15.

The rotor 3 includes the above-mentioned cylindrical portion 3a, a front wall 3b, a cylindrical portion 3c having a large diameter, base portions 3d and 3e, and a pair of support arms 3f and 3g respectively projecting forwardly from the outer peripheries of the base portions 3d and 3e.

The spool 5 includes a fishline winding barrel portion 5a, a front side flange 5b, a rear cylindrical portion 5c and the like.

The spool 5 includes a recessed portion 5d formed in the inside of the rear end portion of the rear cylindrical portion 5c, and an annular portion 6 is fixed integrally to the recessed portion 5d.

The annular portion 6 includes a fixed portion 6a and annular skirt portion 6b which projects inwardly.

The outer periphery of the large-diameter cylindrical portion 3c of the rotor 3 and the inner periphery of the leading end portion of the annular skirt portion 6b of the annular portion 6 are opposed to each other with a small clearance between them.

Referring now to the operation of the present spinning reel for fishing, if the handle 15 is rotated, then the rotor 3 is rotated through the drive gear 4, pinion 2a and drive shaft 2 so that a fishline (not shown) is wound around the fishline winding barrel portion 5a of the spool 5 reciprocatable back and forth.

In actual use, since the cylindrical portion 5c of the spool 5 is exposed except for the portion thereof that is hidden by a pair of support arms 3f and 3g of the rotor 3, the cylindrical portion 5c is easy to receive shocks produced when the reel is dropped. On the other hand, however, as the annular portion 6 is fixed integrally to the inside of the cylindrical portion 5c to reinforce the cylindrical portion 5c, the cylindrical portion 5c is difficult to deform. Further, the annular skirt portion 6b of the annular portion 6 makes it difficult for the fishline and the like to move into the cylindrical portion 5c of the spool 5.

This enables the reel user to operate the handle comfortably without interfering with the rotation of the rotor 3.

The integral fixation of the annular portion 6 to the inside of the rear end portion of the cylindrical portion 5c of the spool 5 makes it possible to reduce the outside diameters of the cylindrical portion 3c of the rotor 3 and the cylindrical portion 5c of the spool 5, to shorten the length of the cylindrical portion 5c of the spool 5, and to form the cylindrical portion 5c of the spool 5 in a small thickness due to reinforcement by the annular portion 6, so that the present spinning reel for fishing can be reduced in size and weight.

If the spinning reel for fishing is structured in the above-mentioned manner, then even if shocks are given when the spinning reel is dropped, the cylindrical portion 5c is difficult to deform because the annular portion 6 is fixed integrally to the inside of the rear end portion of the cylindrical portion 5c, and also the annular skirt portion 6b of the annular portion 6 makes it difficult for the fishline and the like to move into the cylindrical portion 5c of the spool 5.

Thanks to this, not only the handle can be operated comfortably without any interference with the rotation of the rotor 3 but also the spinning reel can be reduced in size and weight.

Figure 2:
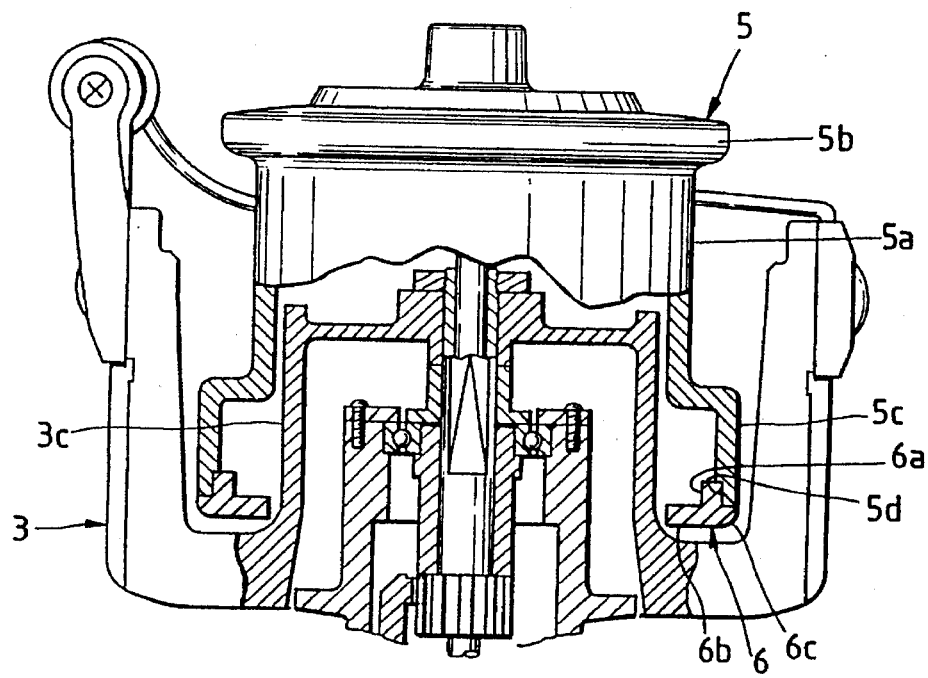
FIG. 2 is a sectional plan view of the main portions of a second embodiment of a spinning reel for fishing according to the invention.
Figure 3:
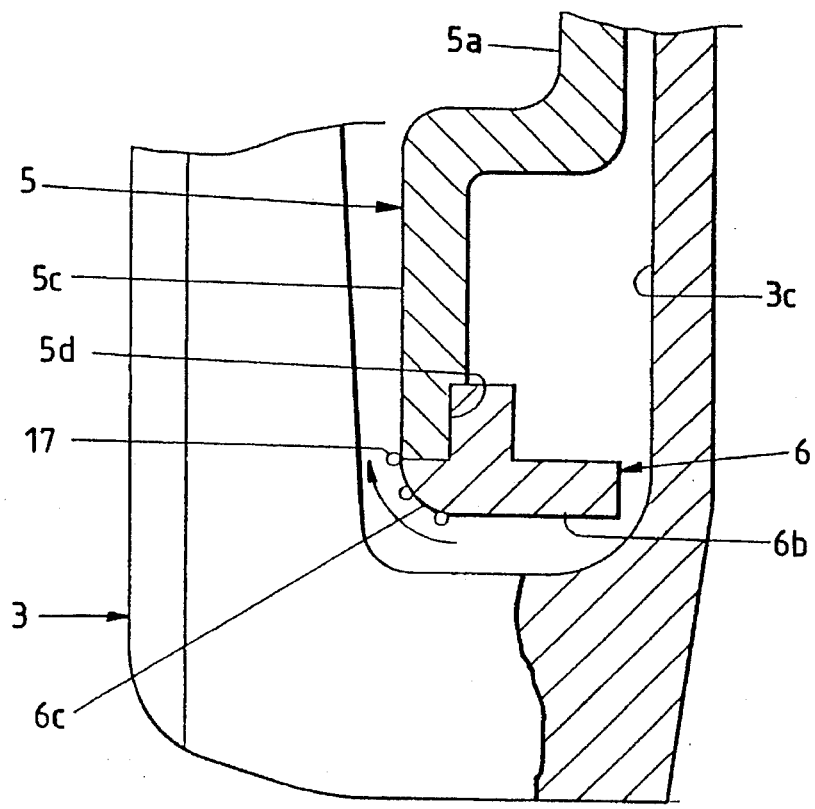
FIG. 3 is a partially enlarged sectional plan view of the main portions shown in FIG. 2.

Referring now to FIGS. 2 and 3, there is shown a second embodiment of a spinning reel for fishing according to the invention. In particular, FIG. 2 is a sectional plan view of the main portions of part of the spinning reel for fishing, and FIG. 3 is a partially enlarged sectional plan view of the main portions shown in FIG. 2.

In the spinning reel for fishing according to the second embodiment, a spool 5 includes a recessed portion 5d formed in the inside of the rear end portion of the rear cylindrical portion 5c thereof, and an annular portion 6 is fixed integrally to the recessed portion 5d.

The annular portion 6 includes a fixed portion 6a, an annular skirt portion 6b, and a curved portion 6c formed in the outside edge portion thereof. And, the annular skirt portion 6b is so formed as to project inwardly.

The outer periphery of the large-diameter cylindrical portion 3c of a rotor 3 and the leading end inner periphery of the annular skirt portion 6b of the annular portion 6 are disposed opposite to each other with a small clearance between them.

Even if a fishline 17 to be wound around the fishline winding barrel portion 5a of the spool 5 moves beyond the rear end portion of the cylindrical portion 5c to the side of the annular portion 6, since the curved portion 6c is formed in the outside edge portion of the annular portion 6, the fishline 17 can be easily moved back to the fishline winding barrel portion 5a.

The remaining portions of the second embodiment are substantially identical in structure with those of the first embodiment.

Figure 4:
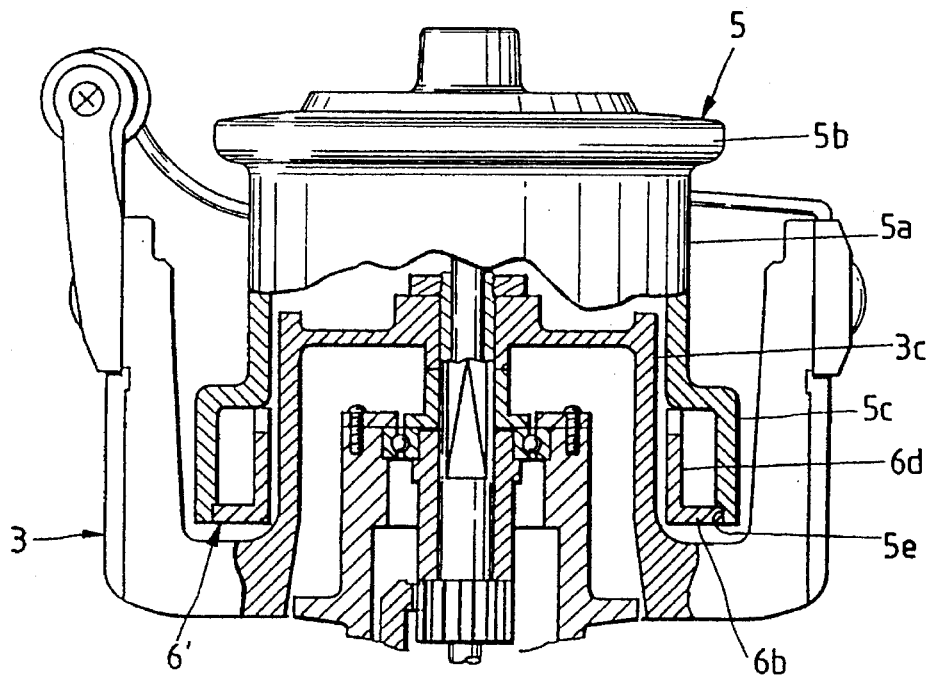
FIG. 4 is a sectional plan view of the main portions of part of a third embodiment of a spinning reel for fishing according to the invention.
Figure 5:
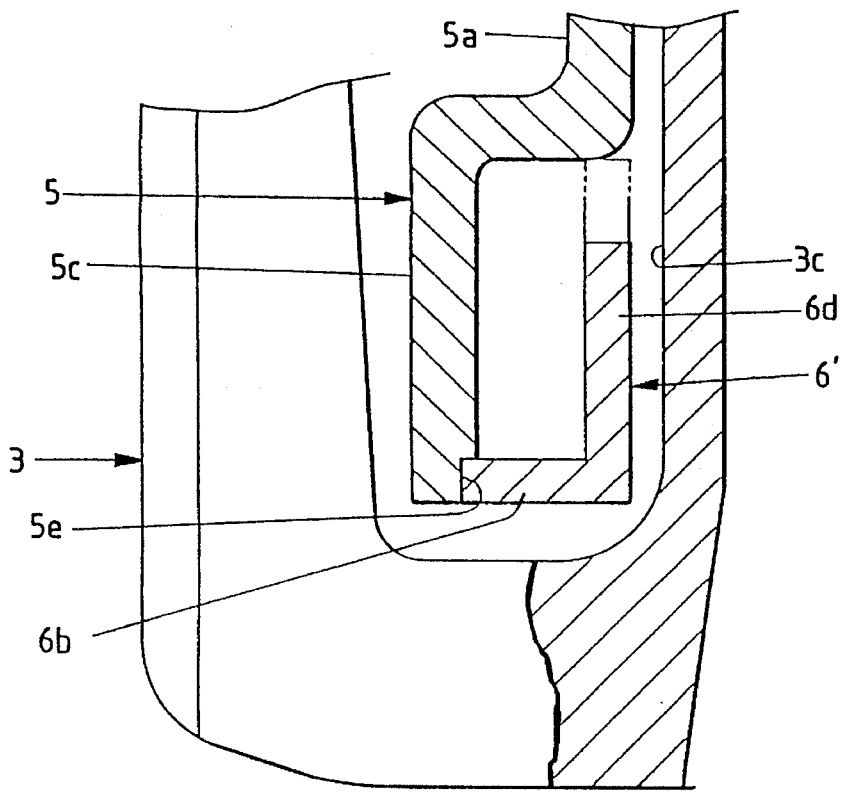
FIG. 5 is a partially enlarged sectional plan view of the main portions shown in FIG. 4.

Referring now to FIGS. 4 and 5, there is shown a third embodiment of a spinning reel for fishing according to the invention. In particular, FIG. 4 is a sectional plan view of the main portion of part of the spinning reel for fishing, and FIG. 15 is a partially enlarged sectional plan view of the main portions shown in FIG. 4.

In the spinning reel for fishing according to the invention, there is formed a recessed portion 5e in the inside of the rear end portion of the rear cylindrical portion 5c of a spool 5, and an annular portion 6' is fixed integrally to the recessed portion 5e of the spool 5.

The annular portion 6' includes an annular skirt portion 6b and a parallel portion 6d extending in parallel to the cylindrical portion 5c, while the annular skirt portion 6b is so formed as to project inwardly.

The outer periphery of the large-diameter cylindrical portion 3c of a rotor 3 and each of the inner periphery of the parallel portion 6d and the inner end of the annular skirt portion 6b are disposed opposed to each other with a small clearance between them.

The parallel portion 6d, alternatively, may be so formed as to have a length which permits the parallel portion 6d to be in contact with the spool 5, as shown by two-dot chained lines in FIG. 5.

The remaining portions of the third embodiment are substantially identical in structure with those of the first embodiment.

Figure 6:
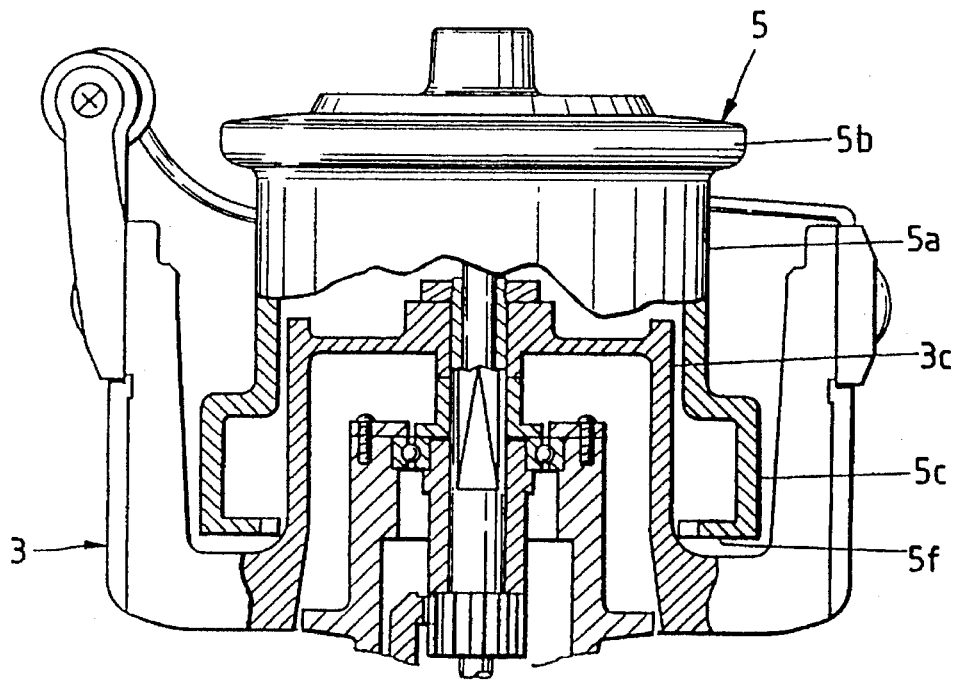
FIG. 6 is a sectional plan view of the main portions of part of a fourth embodiment of a spinning reel for fishing according to the invention

Now, FIG. 6 is a sectional plan view of the main portions of part of a fourth embodiment of a spinning reel for fishing according to the invention.

In the spinning reel for fishing according to the fourth embodiment, the rear end portion of the rear cylindrical portion 5c of a spool 5 is bent inwardly, and an annular portion 5f is formed integrally with the rear end portion of the rear cylindrical portion 5c.

And, the annular portion 5f is so formed as to project inwardly.

The outer periphery of the large-diameter cylindrical portion 3c of a rotor 3 and the annular portion 5f may be opposed to each other with a minute clearance between them.

The remaining portions of the fourth embodiment are substantially identical in structure with those of the first embodiment.

Figure 7:
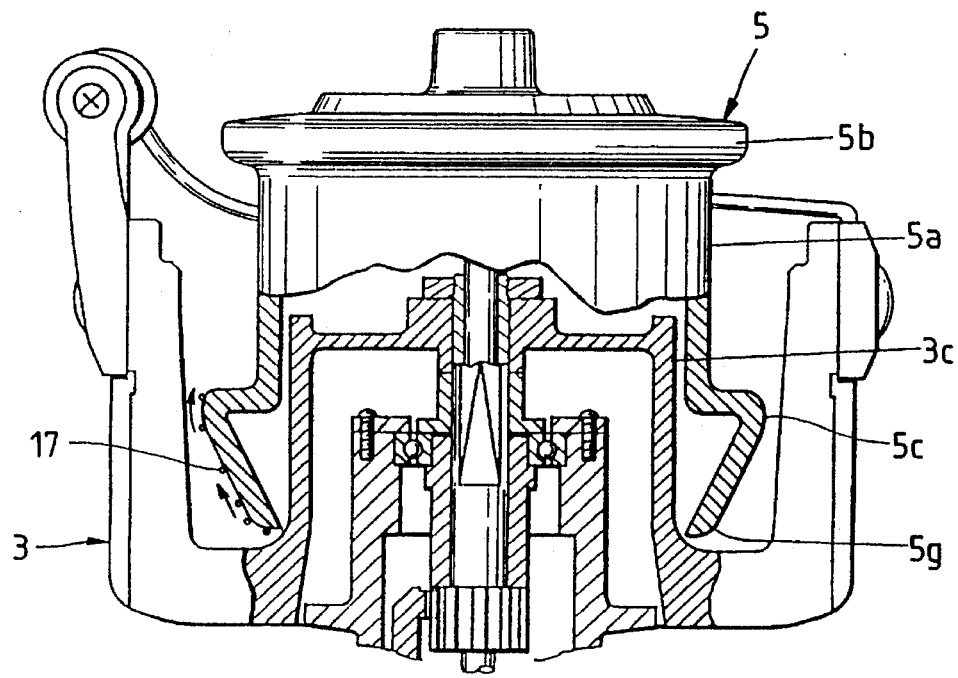
FIG. 7 is a sectional plan view of the main portions of part of a fifth embodiment of a spinning reel for fishing according to the invention.

Now, FIG. 7 is a sectional plan view of the main portions of part of a fifth embodiment of a spinning reel for fishing according to the invention.

In the spinning reel for fishing according to the fifth embodiment, the rear end portion of the rear cylindrical portion 5c of a spool 5 is inclined and bent so that an inclined annular portion 5g is formed integrally with the rear cylindrical portion 5c.

And, the annular portion 5g is formed in such a manner that it projects inwardly.

The leading end inner periphery of the annular portion 5g is opposed to the outer periphery of the large-diameter cylindrical portion 3c of a rotor 3 with a small clearance between them.

Even if a fishline 17 to be wound around the fishline winding barrel portion 5a of the spool 5 moves beyond the cylindrical portion 5c to the side of the annuler portion 5g, the fishline 17 can be easily moved back to the fishline winding barrel portion 5a by the annular portion 5g.

The remaining portions of the fifth embodiment are substantially identical in structure with those of the first embodiment.

Figure 8:
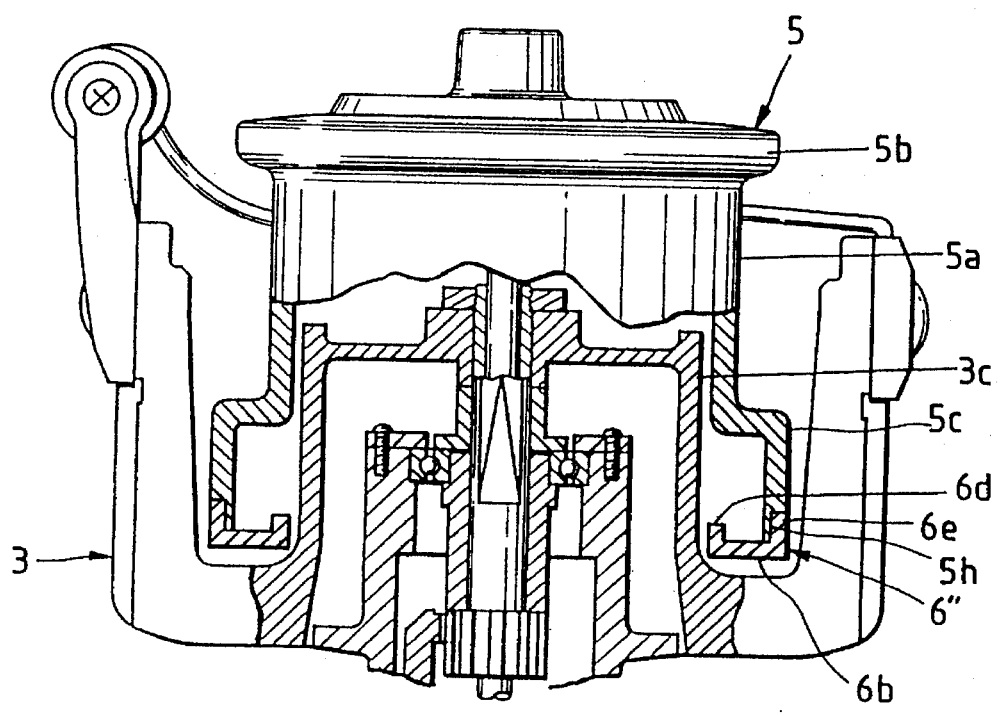
FIG. 8 is sectional plan view of the main portions of part of a sixth embodiment of a spinning reel for fishing according to the invention.

Next, FIG. 8 is a sectional plan view of the main portions of part of a sixth embodiment of a spinning reel for fishing according to the invention.

In the spinning reel for fishing according to the sixth embodiment, a spool 5 includes a recessed portion 5h formed in the outside of the rear end portion of the rear cylindrical portion 5c thereof, and an annular portion 6" is fixed integrally to the recessed portion 5h.

The annular portion 6" includes a fixed portion 6e, an annular skirt portion 6b, and a parallel portion 6d extending in parallel to the cylindrical portion 5c, while the annular skirt portion 6b is so formed as to project inwardly.

The respective inner peripheries of the annular skirt portion 6b and parallel portion 6d of the annular portion 6" are disposed opposite to the outer periphery of the large-diameter cylindrical portion 3c of a rotor 3 with a small clearance between them.

The remaining portions of the sixth embodiment are substantially identical in structure with those of the first embodiment.

Figure 9:
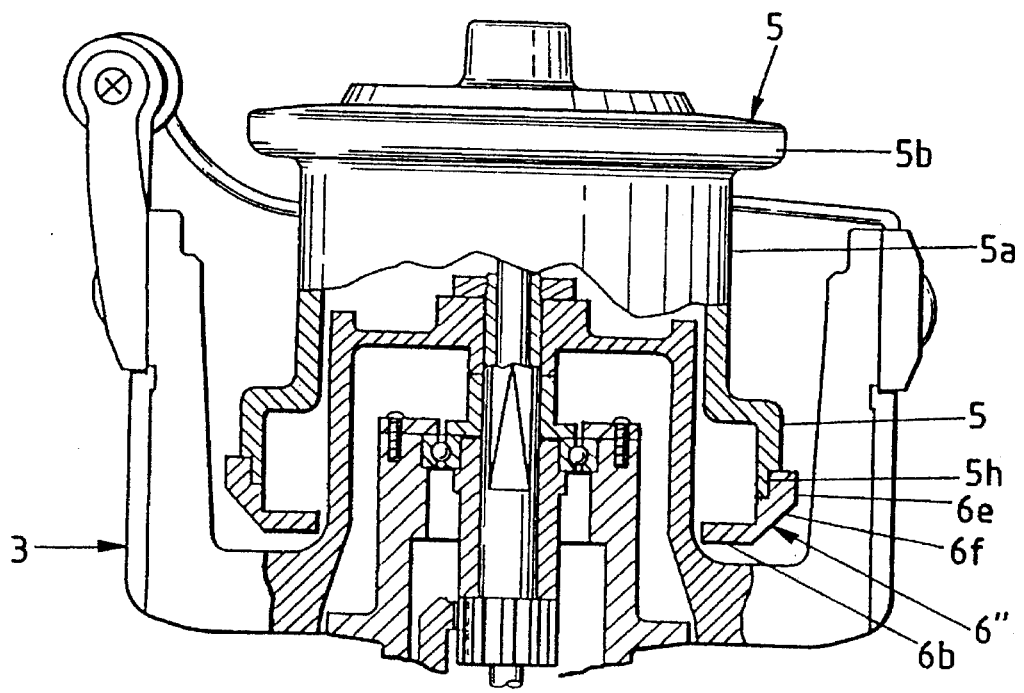
FIG. 9 is a sectional plan view of the main portions of part of a seventh embodiment of a spinning reel for fishing according to the invention.

Now, FIG. 9 is a sectional plan view of the main portions of part of a seventh embodiment of a spinning reel for fishing according to the invention.

In the spinning reel for fishing according to the seventh embodiment, a spool 5 includes a recessed portion 5h formed in the outside of the rear end portion of the rear cylindrical portion 5c thereof, and an annular portion 6" is fixed integrally to the recessed portion 5h.

The annular portion 6" includes a fixed portion 6e projecting outwardly from the outer periphery of the cylindrical portion 5c, an annular skirt portion 6b, and an inclined portion 6f, while the annular skirt portion 6b is so formed as to project inwardly.

The leading end inner periphery of the annular skirt portion 6b of the annular portion 6" is opposed to the outer periphery of the large-diameter cylindrical portion 3c of a rotor with a small clearance between them.

Even if a fishline to be wound around the fishline winding barrel portion 5a of the spool 5 moves beyond the cylindrical portion 5c to the rear end portion side, the fishline can be stopped by the fixed portion 6e projecting outwardly from the outer periphery of the cylindrical portion 5c. Further, even if the fishline goes beyond the fixed portion 6e, the fishline can be easily returned back to the fishline winding barrel portion 5a of the spool 5 by the inclined portion 6f.

The remaining portions of the seventh embodiment are substantially identical in structure with those of the first embodiment.

Since the present invention is structured in the above-mentioned manner, even if shocks are given when the reel is dropped, since the annular portion is integrally fixed to the inside of the rear end portion of the cylindrical portion of the spool, the spool cylindrical portion of the spool is difficult to deform and also the annular portion makes it difficult for the fishline and the like to move into the cylindrical portion of the spool.

Thanks to this, the handle can be operated comfortably without any interference with the rotation of the rotor, and the size and wight of the spinning reel for fishing can be reduced. That is, the present invention can supply a spinning reel for fishing which provides practically excellent effects.

What is claimed is:

1. A spinning reel for fishing comprising:
   a spool reciprocally driven back and forth by a handle;
   a rotor rotatably driven by said handle to wind a fishline onto said spool; and
   an annular portion projecting radially inwardly from a rearmost end portion of said spool to define a first clearance between said annular portion and said rotor, said first clearance being substantially smaller than a second clearance defined by a distance between a radially inner periphery of said spool adjacent said rearmost end portion and said rotor.

2. A spinning reel according to claim 1, wherein said annular portion is securely fixed on said radially inner periphery of said rear end portion of said spool.

3. A spinning reel according to claim 1, wherein a cross section taken along a radius of said annular portion is in the form of a L-shaped section.

4. A spinning reel according to claim 1, wherein said annular portion is in no contact with said rotor.

5. A spinning reel according to claim 1, wherein said annular portion is integral with said rearmost end portion of said spool.

6. A spinning reel according to claim 1, wherein said annular portion forms an acute angle with respect to a rotational axis of said rotor.

7. A spinning reel according to claim 1, wherein said annular portion is securely fixed to a radially outer periphery of said rearmost end of said spool, and directed so as to project radially inwardly from said rear end portion of said spool.

8. A spinning reel according to claim 7, wherein a proximal end of said annular portion where said annular portion is securely fixed to said spool projects radially outwardly from said rearmost end of said spool.

9. A spinning reel according to claim 8, wherein said proximal end is in no contact with said rotor.

10. A spinning reel for fishing comprising:

a spool reciprocally driven back and forth by a handle, said spool having a rear cylindrical portion;

a rotor rotatably driven by said handle to wind a fishline onto said spool; and an annular portion projecting radially inwardly from a rearmost end portion of said rear cylindrical portion of said spool to define a first clearance between said annular portion and said rotor, said first clearance being substantially smaller than a second clearance defined by a distance between a radially inner periphery of said spool adjacent said rearmost end portion and said rotor.

11. A spinning reel according to claim 10, wherein said inner peripheral surface of said rear end portion of said rear cylindrical portion comprises an annular recess, said annular portion being fixed within said recess.

* * * * *